US006871047B2

(12) United States Patent
Iwata

(10) Patent No.: US 6,871,047 B2
(45) Date of Patent: Mar. 22, 2005

(54) RADIO COMMUNICATION CONNECTION DESTINATION SPECIFYING METHOD

(75) Inventor: Shinichiro Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 504 days.

(21) Appl. No.: 09/977,389

(22) Filed: Oct. 16, 2001

(65) Prior Publication Data

US 2002/0045454 A1 Apr. 18, 2002

(30) Foreign Application Priority Data

Oct. 17, 2000 (JP) ........................................ 2000-316201

(51) Int. Cl.[7] ................................................ H04B 7/00
(52) U.S. Cl. ...................... 455/41.2; 455/41.3; 455/517
(58) Field of Search .............................. 455/411, 569.1, 455/557, 344, 41.2, 348, 41.1, 41.3, 41.4, 41.5, 41.6, 456.1, 456.2, 456.3, 456.4, 456.5, 456.6, 556.1, 517

(56) References Cited

U.S. PATENT DOCUMENTS

| | | | |
|---|---|---|---|
| 5,774,673 A | | 6/1998 | Beuk et al. |
| 6,104,333 A | * | 8/2000 | Wood, Jr. .................... 341/173 |
| 6,600,902 B1 | * | 7/2003 | Bell .......................... 455/41.2 |
| 6,631,271 B1 | * | 10/2003 | Logan ....................... 455/456.1 |
| 6,640,098 B1 | * | 10/2003 | Roundtree ................ 455/414.2 |
| 6,697,638 B1 | * | 2/2004 | Larsson et al. ........... 455/553.1 |

FOREIGN PATENT DOCUMENTS

| | | |
|---|---|---|
| CN | 1137726 A | 12/1996 |
| CN | 1046178 C | 11/1999 |
| GB | 2 364 457 A | 1/2002 |
| JP | 7-327009 A | 12/1995 |
| JP | 7-336370 A | 12/1995 |
| JP | 8-204791 A | 8/1996 |
| JP | 9-8867 A | 1/1997 |
| JP | 10-14352 A | 5/1998 |
| JP | 10-135910 | 5/1998 |
| JP | 11-112643 | 4/1999 |
| JP | 11-261738 | 9/1999 |
| JP | 2001-156723 A | 6/2001 |
| WO | WO 94/28686 A1 | 12/1994 |

* cited by examiner

Primary Examiner—Lester G. Kincaid
Assistant Examiner—Sam Bhattacharya
(74) Attorney, Agent, or Firm—Sughrue Mion, PLLC

(57) ABSTRACT

In a radio communication connection destination specifying method of establishing a link between electronic information communication devices in a radio communication system which executes radio communication using a radio wave, device identification information of an electronic information communication device of a connection request source is transmitted to an electronic information communication device of a connection request destination using, as radio communication, radio communication with strong directivity. The electronic information communication device of the connection request destination specifies the electronic information communication device of the connection request source on the basis of the transferred device identification information and establishes the link.

9 Claims, 6 Drawing Sheets

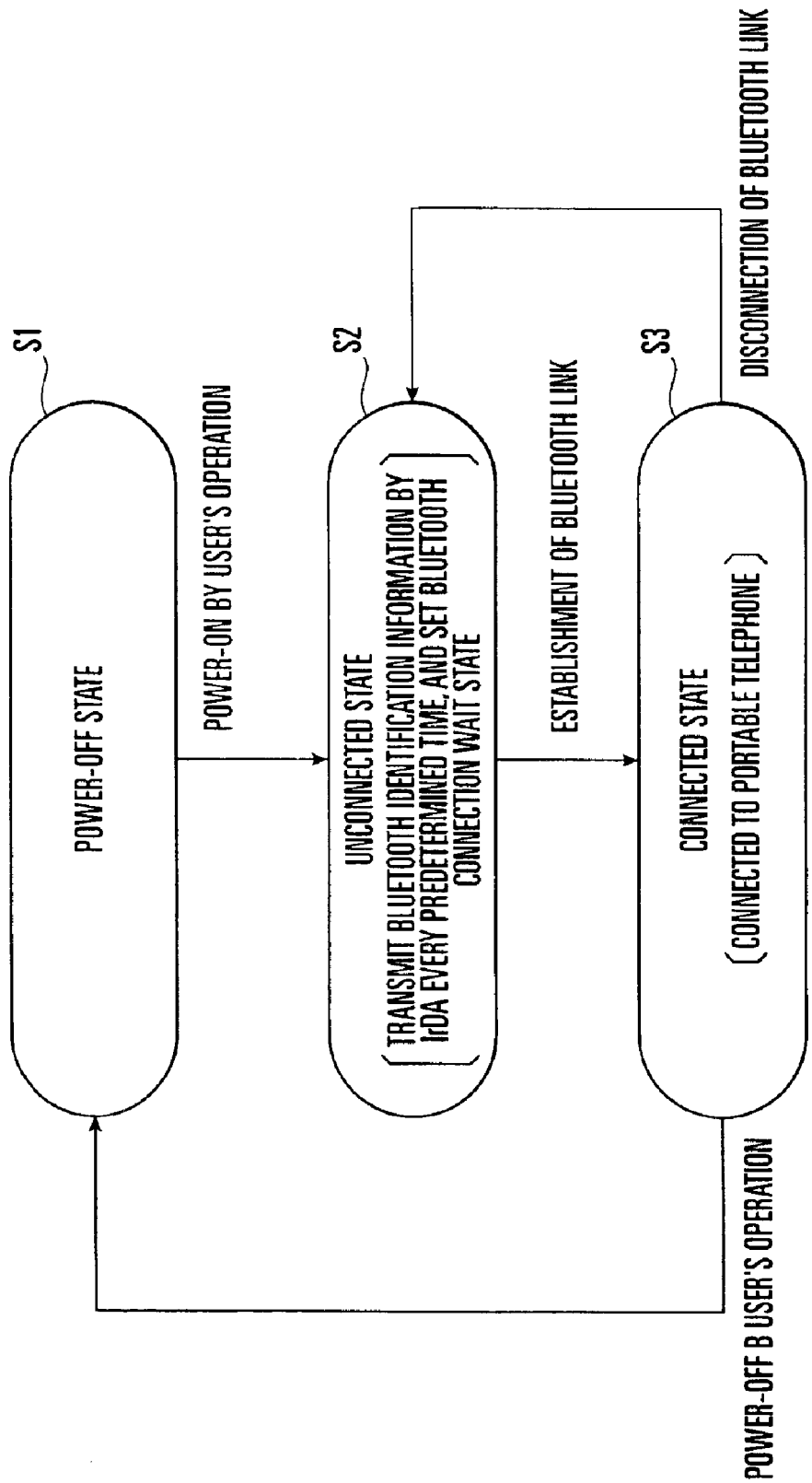

US 6,871,047 B2

RADIO COMMUNICATION CONNECTION DESTINATION SPECIFYING METHOD

BACKGROUND OF THE INVENTION

The present invention relates to a radio communication connection destination specifying method suitable for a radio communication system using a radio wave with weak directivity and, more specifically, to a radio communication connection destination specifying method which can easily specify a connection destination by using infrared radiation with strong directivity for radio communication between electronic information communication devices in a radio communication system.

Conventionally, communication connection between electronic information communication devices is generally done by a wire scheme. Recently, attempts have been extensively made to increase the usability using a radio scheme instead.

An example of a radio communication system using a radio wave that has already been put into practical use and proliferated is an IrDA (Infrared Data Association) system using infrared radiation with strong directivity for radio communication between electronic information communication devices. In the IrDA system, however, the light-emitting surface (transmitting surface) and light-receiving surface (receiving surface) of opposing electronic information communication devices must face each other without being shielded by any obstacle. For this reason, the use environment is limited to some extent.

A radio communication system capable of eliminating such limitation on use environment has also been proposed. For example, in a Bluetooth system using a radio wave with weak directivity, electronic information communication devices in an about 10-m radius area can be wirelessly connected using a radio wave. Such a radio communication system has no limitation on use environment, unlike the IrDA system, and is therefore expected to widely proliferate in the future.

Examples of general radio communication techniques between electronic information communication devices are disclosed in Japanese Patent Laid-Open No. 10-135910 "microcomputer mounted control panel and parking lot management system provided with control panel", Japanese Patent Laid-Open No. 11-112643 "hand-free speech device", and Japanese Patent Laid-Open No. 11-261738 "speaking system in portable telephone".

To specify a connection destination in communication connection between electronic information communication devices, in the wire scheme, the electronic information communication devices are physically connected through a cable. In the IrDA scheme, the electronic information communication devices are physically made to face each other. To the contrary, the above-described Bluetooth system cannot be achieved using the above-described physical method. Since it is necessary to specify the connection destination by a logical identifier, the connection scheme becomes complex, and the connection destination cannot be easily specified.

FIGS. 6A to 6C show a procedure of specifying a connection destination in a conventional Bluetooth system.

In the conventional Bluetooth system, to specify a connection destination, at the initial phase, a portable telephone 3 serving as a main electronic information communication device transmits an inquiry request to wireless headsets 1 and 2 serving as peripheral electronic information communication devices, and each of the wireless headsets 1 and 2 returns an inquiry response (FIG. 6A). Next, at the intermediate phase, the user selects by key operation a desired connection destination (wireless headset 1) from the pieces of identification information of the wireless headsets 1 and 2 that have returned the inquiry responses and are displayed on a display screen 3a of the portable telephone 3 (FIG. 6B). At the final phase, a Bluetooth link is established for the wireless headset 1, i.e., the connection destination selected by the portable telephone 3 (FIG. 6C).

In the above-described Bluetooth system, a Bluetooth device address serving as an identifier is used as the device identification information of each of the wireless headsets 1 and 2. However, since the Bluetooth device address is a combination of a predetermined number of numbers and characters, the connection destination actually desired by the user can hardly be specified from the device list sent to the portable telephone 3.

That is, even when a method of displaying the identifiers (device identification information of the wireless headsets 1 and 2) on each electronic information communication device (portable telephone 3) is applied, the user must know in advance the identifier (device identification information of the wireless headset 1 or 2) of the electronic information communication device as a desired connection destination. The reason for this is the same as in a normal telephone call, i.e., the user cannot make a telephone call unless he/she knows the telephone number of the other party in advance.

SUMMARY OF THE INVENTION

It is an object of the present invention to provide a radio communication connection destination specifying method which can easily specify a connection destination by a user in radio communication between electronic information communication devices.

In order to achieve the above object, according to the present invention, there is provided a radio communication connection destination specifying method of establishing a link between electronic information communication devices in a radio communication system which executes radio communication using a radio wave, comprising the steps of transferring device identification information of an electronic information communication device of a connection request source to an electronic information communication device of a connection request destination using, as radio communication, radio communication with strong directivity, and causing the electronic information communication device of the connection request destination to specify the electronic information communication device of the connection request source on the basis of the transferred device identification information and to establish the link.

BRIEF DESCRIPTION OF THE DRAWINGS

FIG. 2 is a flow chart showing processing operation on the wireless headset side shown in FIGS. 1A to 1C;

DESCRIPTION OF THE PREFERRED EMBODIMENTS

The present invention will be described below in detail with reference to the accompanying drawings.

Figure 1A:
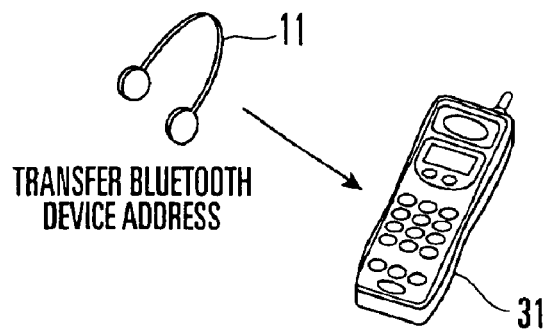
FIGS. 1A to 1C are views showing procedures at the initial, intermediate, and final phases in specifying a connection destination in a Bluetooth system using a radio communication connection destination specifying method according to the first embodiment of the present invention.
Figure 1B:
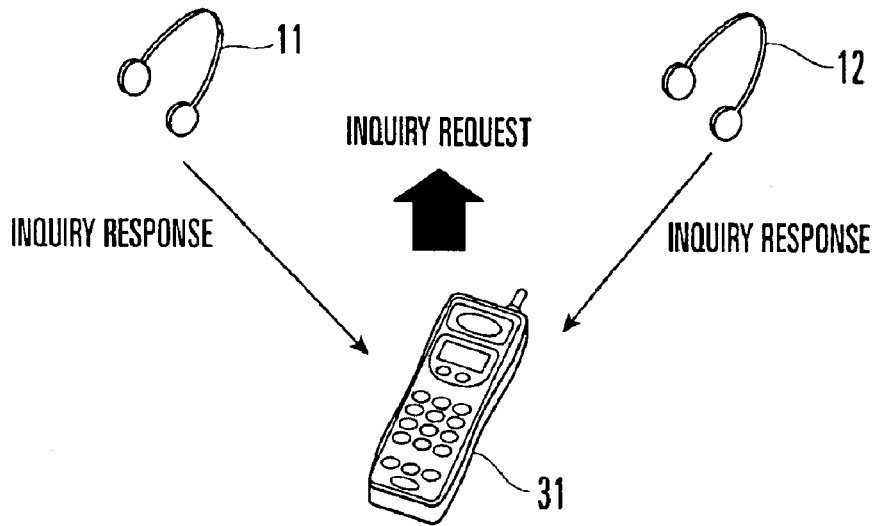
Figure 1C:
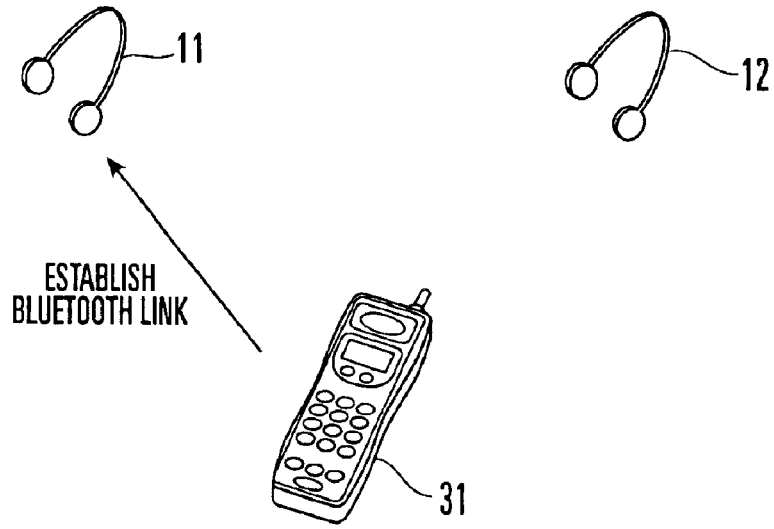

FIGS. 1A to 1C show the procedures of specifying a connection destination in a Bluetooth system using a radio communication connection destination specifying method according to the first embodiment of the present invention. In this Bluetooth system, wireless headsets 11 and 12 can transmit/receive voice data to/from a portable telephone 31 by the Bluetooth scheme without holding the portable telephone 31 by a hand. The portable telephone 31 has a Bluetooth interface and IrDA interface. The Bluetooth interface is used for an application purpose with a relatively long communication time, such as voice data transmission with respect to the wireless headset 11 or 12 or data communication with a personal computer (not shown). The IrDA interface is used for an application purpose with a relatively short communication time, such as electronic card exchange with another portable telephone or PDA (Personal Digital Assistants).

The wireless headsets 11 and 12 have different pieces of Bluetooth device identification information to identify each other. Each of the wireless headsets 11 and 12 also has a Bluetooth interface and IrDA interface, like the portable telephone 31. The IrDA interface copes with only transmission. That is, since the IrDA interface is used to only one-sidedly always transmit the same frame format, as will be described later, it requires no complex hardware or software for processing the IrDA protocol and therefore has a simple structure. In addition, since the IrDA interface is used for the purpose of specifying a connection device, an arrangement suitable for the purpose is required in terms of directivity of light or communication range. More specifically, preferably, the directivity is ±15" defined by the IrDA, and the communication range is about 20 to 30 cm.

To specify a connection destination in the Bluetooth system, at the initial phase, the wireless headset 11 serving as a peripheral electronic information communication device that wants connection is made to face the portable telephone 31 serving as a main electronic information communication device. In this state, the wireless headset 11 transmits to the portable telephone 31 as the main electronic information communication device by the IrDA a Bluetooth device address as device identification information necessary for Bluetooth connection (FIG. 1A).

At the intermediate phase, the portable telephone 31 transmits an inquiry request for Bluetooth link establishment to the wireless headsets 11 and 12, and each of the wireless headsets 11 and 12 returns an inquiry response (FIG. 1B). Each returned inquiry response contains a Bluetooth device address as device identification information.

At the final phase, the portable telephone 31 compares device identification information received by the IrDA with each device identification information received by the inquiry response. The portable telephone 31 makes Bluetooth connection to the wireless headset 11 that matches the device identification information, thereby establishing a Bluetooth link to the wireless headset 11 as the connection destination (FIG. 1C).

According to this embodiment, even when a device (wireless headset) that does not want connection is present in the Bluetooth area, Bluetooth connection to only a device that wants connection can be automatically done by making the devices that want connection face each other.

The processing operation on the side of the wireless headsets 11 and 12 will be described next with reference to the flow chart shown in FIG. 2.

The wireless headsets 11 and 12 in the power-OFF state (step S1) are powered on by user's power-on operation and shift to an "unconnected state" (step S2). In the "unconnected state (step S2)", a Bluetooth device address as Bluetooth identification information is transmitted to the portable telephone 31 on the basis of a frame format (to be described later) by the Ultra specification (Infrared Data Association Guidelines for Ultra Protocols: Oct. 15, 1997) defined by the IrDA, and then, a Bluetooth connection wait state is set. This Bluetooth connection wait state continues until Bluetooth connection from the portable telephone 31 is made, and a Bluetooth link is normally established. The state shifts to a "connected state (step S3)" wherein a Bluetooth link is established.

In the "connected state (step S3), the wireless headsets 11 and 12 are connected to the portable telephone 31 by Bluetooth connection and set in an operative state. In this state, since the device identification information need not be transmitted by the IrDA, the IrDA interface stops functioning. However, when the user executes power-off operation, the state shifts to a "power-OFF state (step S1)". Alternatively, if the Bluetooth link is disconnected due to some error, the "connected state "step S3" returns to the "unconnected state (step S2)", so the Bluetooth identification information (device identification information) is transmitted and output by the IrDA again every predetermined time.

Figure 3:
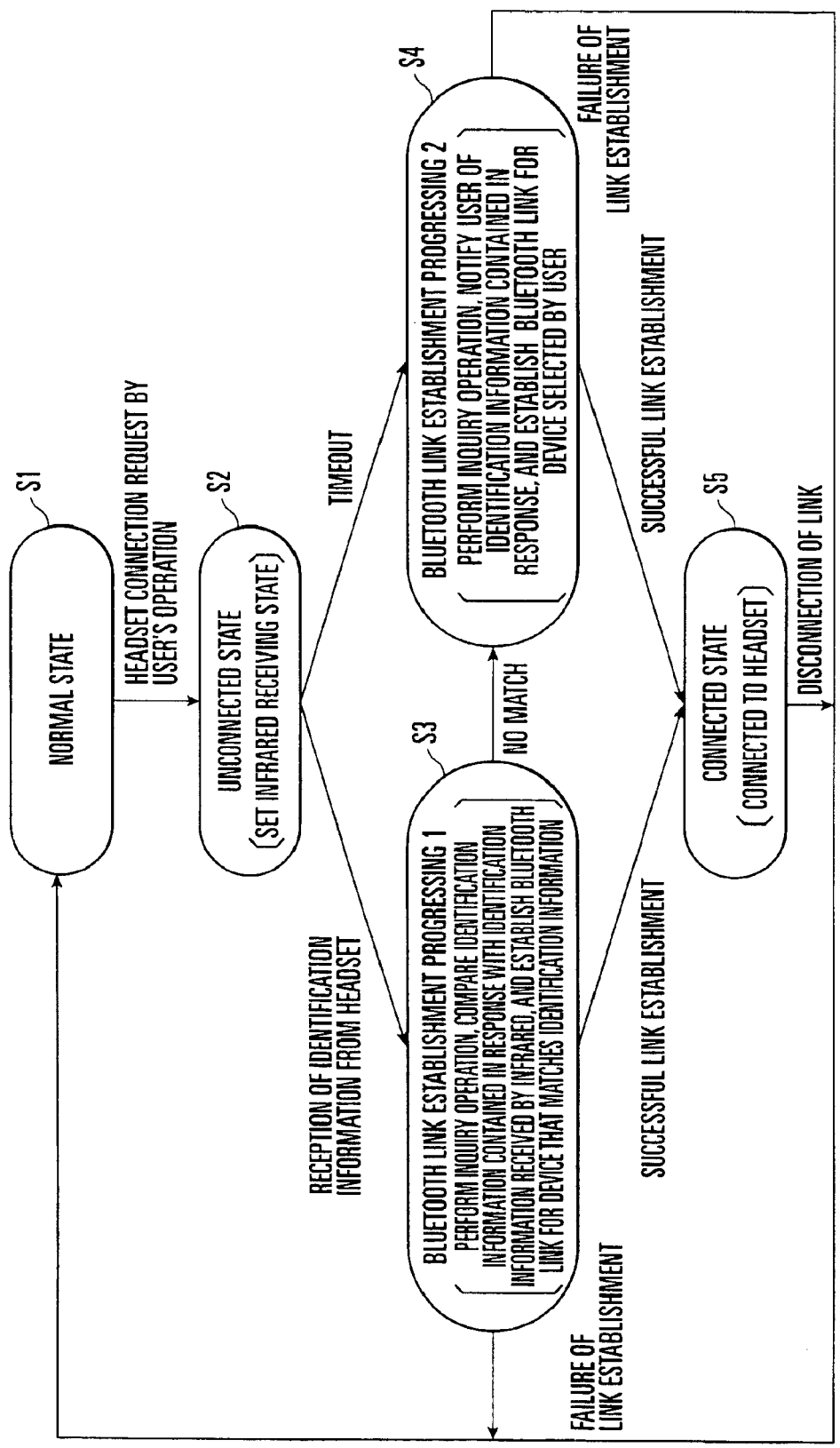
FIG. 3 is a flow chart showing processing operation on the portable telephone side shown in FIGS. 1A to 1C.

The processing operation on the portable telephone 31 side will be described next with reference to the flow chart shown in FIG. 3.

First, upon receiving a headset connection request by user's operation in a "normal state (step S1), the portable telephone 31 shifts to an "unconnected state (step S2)". The "normal state (step S1)" means that the power of the portable telephone 31 is ON, and no Bluetooth link is established.

In the "unconnected state (step S2)", the portable telephone 31 is set in an infrared receiving state. In this state, when device identification information from each of the wireless headsets 11 and 12 is normally received, the state shifts to "Bluetooth link establishment progressing 1 (step 3)". On the other hand, in case of timeout wherein no device identification information is received within a predetermined time, the state shifts to "Bluetooth link establishment progressing 2 (step 4)".

In the "Bluetooth link establishment progressing 1 (step 3)", inquiry operation (inquiry request) defined by the Bluetooth specification (Specification of Bluetooth Systems, Profiles, Generic Access Profile, Dec. 1, 1999) is performed, and responses (inquiry responses) from active devices in the Bluetooth area are waited. After receiving responses, device identification information (Bluetooth device address) contained in each response is compared with device identification information (Bluetooth device address) received by infrared radiation, and Bluetooth link establishment by Bluetooth connection is tried for a device (wireless headset) that matches the device identification information.

If link establishment is successfully done, the state shifts to a "connected state (step S5)". If no device that matches the device identification information is detected, the state shifts to the "Bluetooth link establishment progressing 2 (step 4)" because selection of a connection destination by the user is necessary. If link establishment fails due to some error, the state shifts to the "normal state (step S1)".

In the "Bluetooth link establishment progressing 2 (step 4)", inquiry operation (inquiry request) defined by the Bluetooth specification is performed, and responses (inquiry responses) from active devices in the Bluetooth area are waited. After receiving responses, the user is notified of the pieces of device identification information contained in the responses, and Bluetooth link establishment by Bluetooth connection is tried for a device selected by the user. If link establishment is successfully done, the state shifts to the "connected state (step S5)". If link establishment fails due to some error, the state shifts to the "normal state (step S1)".

In the "connected state (step S5)", the portable telephone 31 is connected to the wireless headset 11 or 12, and the transmitting device (microphone) and receiving device (speaker) on the portable telephone 31 side stop. In this state, if user's operation is done or the link is disconnected due to some error, the state shifts to the "normal state (step S1)".

Figure 4:
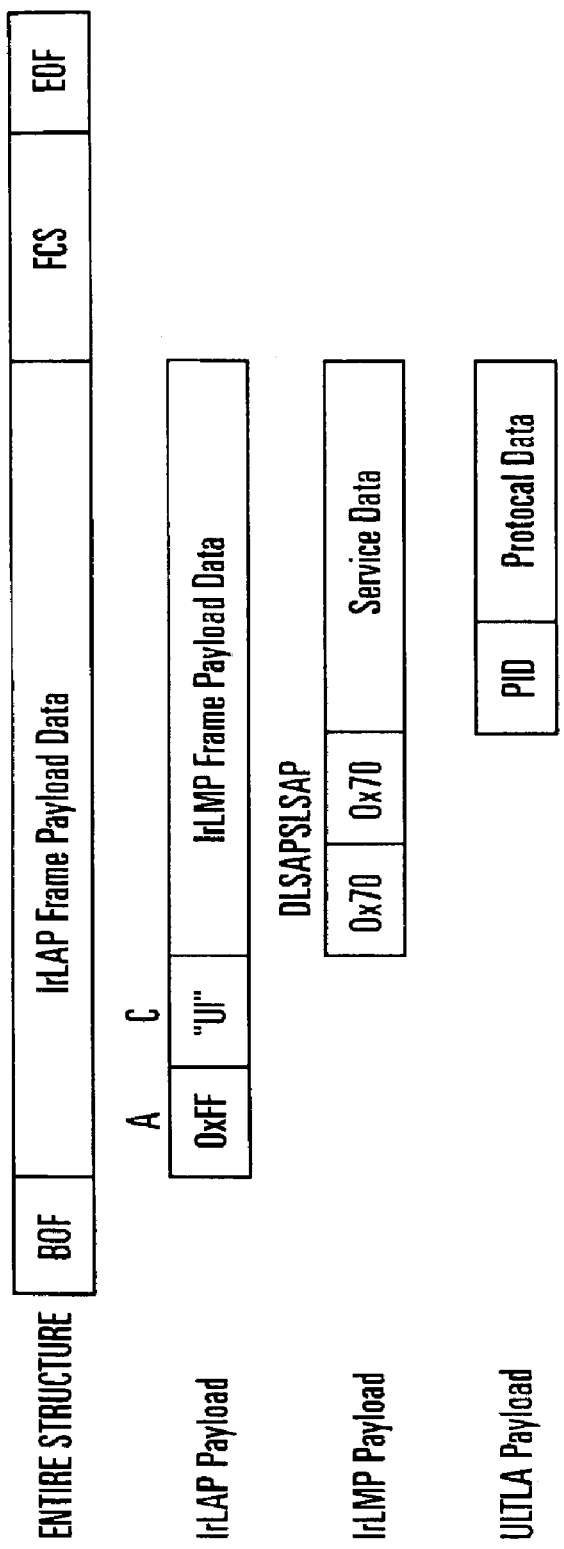
FIG. 4 is a view showing a frame format output and transmitted from the wireless headset shown in FIGS. 1A to 1C by the IrDA.

FIG. 4 shows a frame format output and transmitted from the wireless headset 11 or 12 by the IrDA. The Ultra specification applied here is a scheme of one-sidedly transmitting data to the other party in a nonconnection state, i.e., without any connection protocol in the IrDA. As a characteristic feature, no confirmation ACK (ACKnowledge) is required as a transfer protocol.

More specifically, the Payload of the Ultra layer is encapsulated into the Payload of a lower layer, i.e., IrLMP/IrLAP. The Payload of the Ultra layer is formed from two parts, i.e., a protocol identifier (PID) and data (Protocol Data) to be actually transferred. A dedicated code for Bluetooth connection is defined in the protocol identifier, and Bluetooth device identification information (Bluetooth device address) to be actually transferred is laid out in the Protocol Data.

Upon receiving an Ultra frame, the portable telephone 31 determines on the basis of the protocol identifier stored in the PID field whether the received Ultra frame is a Bluetooth connection frame. Only when it is determined that the Ultra frame is a Bluetooth connection frame, device identification information (Bluetooth device address) is extracted from the Protocol Data field. When the application-specific code of the present invention is defined in the protocol identifier, any reception error for a frame output by another application using the Ultra specification can be prevented.

Figure 5A:
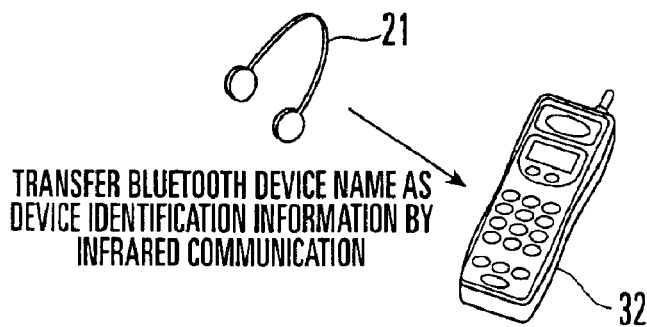
FIGS. 5A to 5C are views showing procedures at the initial, intermediate, and final phases in specifying a connection destination in a Bluetooth system using a radio communication connection destination specifying method according to the second embodiment of the present invention.
Figure 5B:
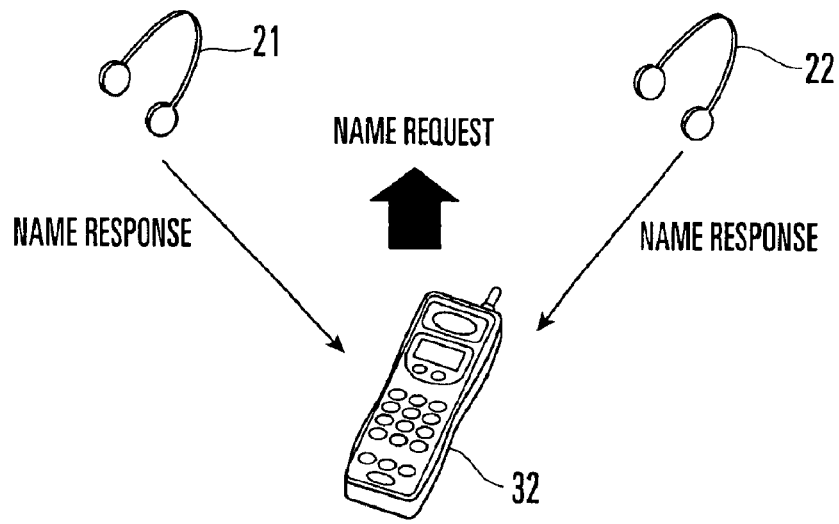
Figure 5C:
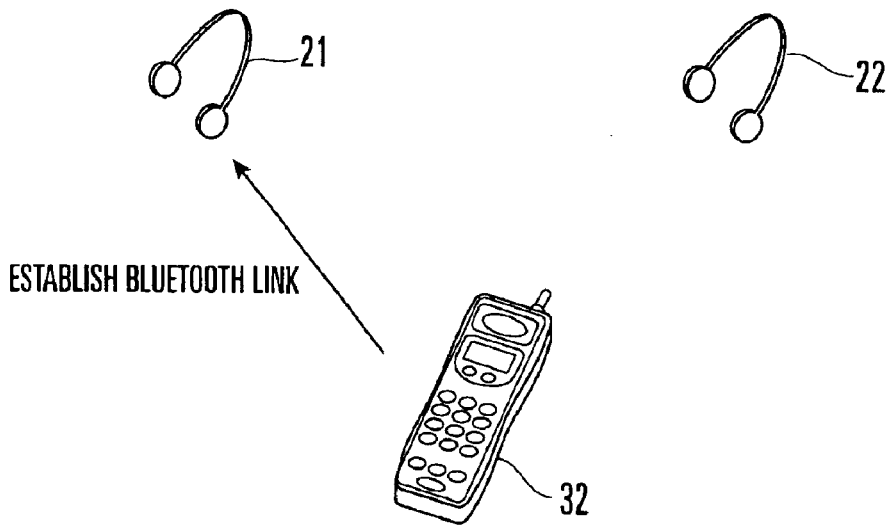
Figure 6A:
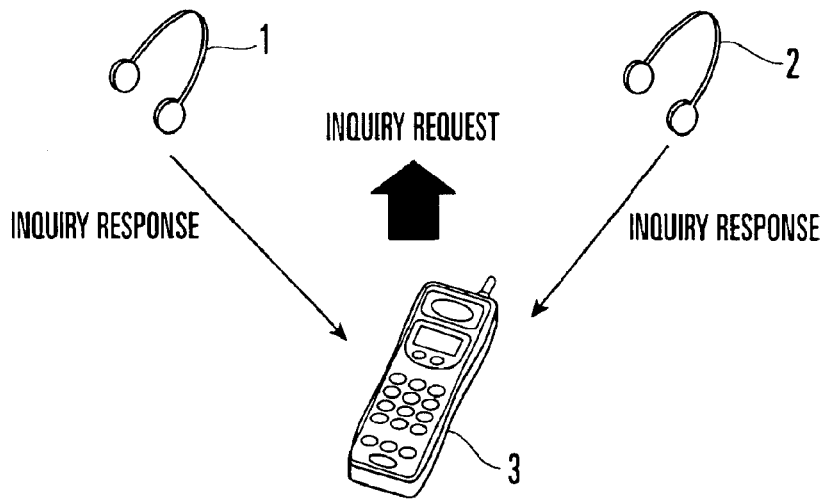
FIGS. 6A to 6C are views showing procedures at the initial, intermediate, and final phases in specifying a connection destination in a conventional Bluetooth system.
Figure 6B:
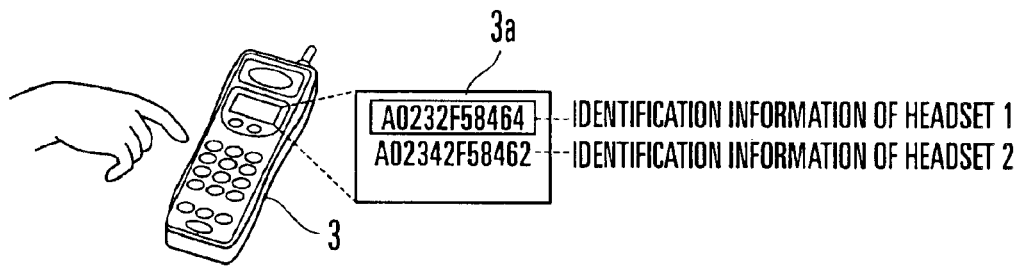
Figure 6C:
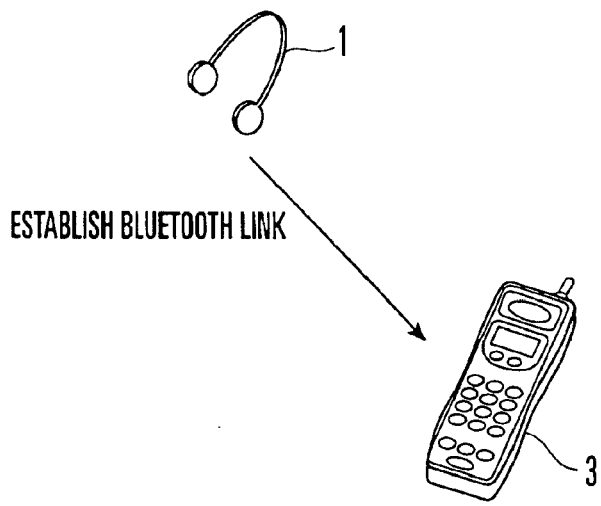

FIGS. 5A to 5C show procedures of specifying a connection destination in a Bluetooth system using a radio communication connection destination specifying method according to another embodiment of the present invention.

The Bluetooth system of the second embodiment is different from that of the first embodiment in that a Bluetooth device name is used in place of a Bluetooth device address as device identification information.

To specify a connection destination in this Bluetooth system, at the initial phase, a wireless headset 21 serving as a peripheral electronic information communication device that wants connection is made to face a portable telephone 32 serving as a main electronic information communication device. In this state, the wireless headset 21 transmits to the portable telephone 32 as the main electronic information communication device by the IrDA a Bluetooth device name as device identification information necessary for Bluetooth connection (FIG. 5A).

At the intermediate phase, the portable telephone 32 transmits a name request for Bluetooth link establishment to the wireless headsets 21 and 22, and each of the wireless headsets 21 and 22 returns a name response (FIG. 5B). Each returned name response contains a Bluetooth device name as device identification information.

At the final phase, the portable telephone 32 compares device identification information received by the IrDA with each device identification information received by the name response. The portable telephone 32 makes Bluetooth connection to the wireless headset 21 that matches the device identification information, thereby establishing a Bluetooth link to the wireless headset 21 as the connection destination (FIG. 5C).

According to this embodiment, even when a device (wireless headset) that does not want connection is present in the Bluetooth area, Bluetooth connection to only a device that wants connection can be automatically done by making the devices that want connection face each other, as in the first embodiment.

In the above-described embodiments, the portable telephone 31 or 32 and wireless headset 11, 12, 21, or 22 serving as electronic information communication devices are connected by Bluetooth connection. However, the present invention is not limited to such a system. The present invention can also be applied to a Bluetooth system which uses other electronic information communication devices under similar conditions to connect, e.g., a personal computer and wireless keyboard by Bluetooth connection.

In the above-described embodiments, the Ultra specification is applied as an IrDA communication protocol and frame format. However, the present invention is not limited to the Ultra specification. For example, any other protocol which requires no confirmation ACK as a transfer protocol (connectionless service) and, more particularly, a protocol which uses a UI frame prepared in the IrDA specification can be used. A protocol which requires a confirmation ACK (connection-oriented service) may be used. In the latter case, since the IrDA interface on the side of the wireless headsets 11, 12, 21, and 22 must cope with transmission/reception, an IrDA interface of the same type as that on the side of the portable telephones 31 and 32 is required.

In the above-described embodiments, a radio communication system using a radio wave with weak directivity has been exemplified, and an IrDA system has been assumed as a communication system using infrared radiation with strong directivity. However, the present invention is limited to neither communication systems. That is, the present invention can be applied to any other system as long as it uses a radio communication system using infrared radiation with strong directivity in specifying a connection destination of a radio communication system using a radio wave with weak directivity.

As has been described above, according to the present invention, since link establishment is done only by causing devices that want connection to face each other, a connection method in a radio communication system using a radio wave with a weak directivity can be simplified. In addition, a connection destination can easily be specified, and consequently, a connection destination can easily be specified by the user for radio communication between electronic information communication devices in a radio communication system.

What is claimed is:

1. A radio communication method of establishing a link between communication devices in a radio communication system, comprising:

transferring device identification information of a communication device of a connection request source to a communication device of a connection request destination using a radio communication with strong directivity;

transmitting an inquiry request from the communication device of the connection request destination;

receiving, at the communication device of the connection request destination, inquiry responses from a plurality of communication devices;

recalling the transferred device identification information of the communication device of the connection request source, and comparing the transferred device identification information to identification information contained within the received inquiry responses; and establishing a link between the connection request source and the connection request destination on the basis of a match between the transferred device identification information of the communication device of the connection request source, and identification information contained within one of the received inquiry responses.

2. The method according to claim 1, wherein the radio communication system is a short-distance radio data communication system.

3. The method according to claim 1, wherein the radio communication with strong directivity is infrared communication.

4. The method according to claim 3, wherein the infrared communication uses a connectionless service.

5. The method according to claim 3, wherein the infrared communication uses a connection-oriented service.

6. The method according to claim 1, wherein the device identification information comprises a short-distance radio data communication device address.

7. The method according to claim 1, wherein the device identification information comprises a short-distance data communication device name.

8. The method according to claim 1, further comprising:

before transferring the device identification information, causing the communication device of the connection request source to face the communication device of the connection request destination.

9. The method according to claim 1, further comprising:

setting a receiving state in the communication device of the connection request destination;

if no device identification information is transferred during the transferring step, within a predetermined time after the receiving state is set, transmitting the inquiry request to all communication devices, receiving the inquiry responses, and notifying a user of pieces of device identification information contained in the received inquiry responses; and establishing the link upon determining the electronic information device selected by a user operation as the connection request source.

* * * * *